US012759509B2

(12) United States Patent
Yong et al.

(10) Patent No.: US 12,759,509 B2
(45) Date of Patent: Oct. 13, 2026

(54) AUTOMATIC CLEANING SYSTEM AND METHOD FOR VEHICLE FLOOR

(71) Applicant: GM GLOBAL TECHNOLOGY OPERATIONS LLC, Detroit, MI (US)

(72) Inventors: Seokju Yong, Bucheon-si (KR); Jooyoul Lee, Incheon (KR); Semoon Choi, Incheon (KR); Dongjin Kang, Namdong-gu (KR); Dongseok Yoon, Seoul (KR); Bongbum Back, Incheon (KR)

(73) Assignee: GM Global Technology Operations LLC, Detroit, MI (US)

(*) Notice: Subject to any disclaimer, the term of this patent is extended or adjusted under 35 U.S.C. 154(b) by 350 days.

(21) Appl. No.: 18/677,092

(22) Filed: May 29, 2024

(65) Prior Publication Data

US 2025/0368163 A1 Dec. 4, 2025

(51) Int. Cl.

| | |
|---|---|
| ***B60S 1/64*** | (2006.01) |
| ***B60H 3/06*** | (2006.01) |
| ***B60N 2/90*** | (2018.01) |

(52) U.S. Cl.

CPC .............. *B60S 1/64* (2013.01); *B60H 3/0608* (2013.01); *B60N 2/90* (2018.02)

(58) Field of Classification Search

CPC ............ B60S 1/64; B60H 3/0608; B60N 2/90

See application file for complete search history.

(56) References Cited

FOREIGN PATENT DOCUMENTS

| | | | | | |
|---|---|---|---|---|---|
| DE | 10021905 | A1 * | 11/2001 | ............... | A47L 5/12 |
| DE | 102016220275 | A1 * | 4/2018 | ................ | B60S 1/64 |
| DE | 102018108177 | A1 * | 10/2019 | ................ | B60S 1/64 |
| DE | 102021109771 | A1 * | 10/2022 | ............. | B60N 2/757 |
| DE | 102021205560 | A1 * | 12/2022 | ................ | B60S 1/64 |
| DE | 102022004760 | A1 * | 6/2023 | ............... | A47L 7/00 |
| EP | 3549502 | A1 * | 10/2019 | ................ | B60S 1/64 |
| FR | 2689474 | A1 * | 10/1993 | ................ | B60S 1/64 |
| KR | 1020070078756 | A | 1/2007 | | |
| KR | 20070078756 | A * | 8/2007 | ............. | B62D 25/20 |
| KR | 20090090647 | A * | 8/2009 | ........... | A47L 9/1666 |
| KR | 101389580 | B1 * | 5/2014 | ........... | A47L 7/0061 |
| KR | 20220029858 | A * | 3/2022 | ................ | B60S 1/64 |
| KR | 1020220029858 | A | 10/2022 | | |
| WO | WO-2021032440 | A1 * | 2/2021 | ............... | B60N 3/08 |
| WO | WO-2022004925 | A1 * | 1/2022 | ............... | B08B 1/34 |

* cited by examiner

*Primary Examiner* — Marc Carlson
(74) *Attorney, Agent, or Firm* — Quinn IP Law

(57) ABSTRACT

A system for cleaning a floor surface in a vehicle includes a vehicle seat having a seat frame and a leg recliner assembly. A brush assembly is integrated with the leg recliner assembly. The leg recliner assembly has a base section operatively connected to the seat frame and a leg-rest section. A portable cleaner is fitted within the base section and is fluidly coupled with the brush assembly. A controller is adapted to, upon activation of an automatic cleaning mode, move the vehicle seat along a first axis until a rack and pinion mechanism moves to an engaged position and adjust a position of the leg-rest section such that a portion of the brush assembly is in contact with the floor surface. The rack and pinion mechanism is adapted to guide motion of the brush assembly along a second axis to clean the floor surface.

20 Claims, 4 Drawing Sheets

200

210 Automatic cleaning mode activated

212 Ensure vehicle seat is vacant

214 Move vehicle seat until steering unit engaged

216 Open window(s) to predetermined amount

218 Adjust position of leg rest and brush contact

220 Move brush along second axis to clean floor

222 Move vehicle seat to rest position

224 Activate air-cleaning module, close window(s)

AUTOMATIC CLEANING SYSTEM AND METHOD FOR VEHICLE FLOOR

INTRODUCTION

The present disclosure relates to an automatic system and method for automatically cleaning a floor surface in a vehicle. It is an undeniable facet of modern life that many people spend a considerable amount of time in their vehicles, while being transported from one place to another. Dirt and/or soil on shoes enters the vehicle compartment and stays on the floor surface compartment. Cleaning the flooring in a vehicle compartment generally requires external equipment and much effort.

SUMMARY

Disclosed herein is a system for cleaning a floor surface in a vehicle. The vehicle includes a vehicle seat having a seat frame and a leg recliner assembly. The leg recliner assembly has a base section operatively connected to the seat frame. A brush assembly is integrated with the leg recliner assembly. A portable cleaner is fitted within the base section. The portable cleaner is fluidly coupled with the brush assembly. A rack and pinion mechanism is operatively connected to the seat frame. The system includes a controller having a processor and tangible, non-transitory memory on which instructions are recorded for executing an automatic cleaning mode. The controller is adapted to, upon activation of the automatic cleaning mode, move the vehicle seat along a first axis until the rack and pinion mechanism moves from a rest position to an engaged position. The position of the leg recliner assembly is adjusted such that a portion of the brush assembly is in contact with the floor surface. The rack and pinion mechanism is adapted to guide motion of the brush assembly along a second axis to clean the floor surface during the automatic cleaning mode.

The rack and pinion mechanism includes a rack and a pinion gear configured such that rotation of the pinion gear causes linear motion of the rack and the base section along the second axis. The rack and pinion mechanism is in the engaged position when the pinion gear is in contact with the rack. A seat motor may be adapted to selectively power motion of the vehicle seat. A torque sensor may be adapted to monitor a position of the brush assembly. The controller is adapted to adjust the position of the leg-rest section based on data from the torque sensor.

In some embodiments, the portable cleaner includes a suction motor and a dust collector. The leg-rest section is pivotable relative to the base section, with the leg-rest section being positioned at an angle relative to the base section. A power source is adapted to charge the suction motor. The controller is adapted to ensure that the vehicle seat is vacant prior to moving the vehicle seat.

The brush assembly may include an intake port adapted to receive particles from the floor surface and a first channel adapted to at least partially direct flow of the particles between the intake port and the dust collector. The system may include a second channel embedded within the base section and fluidly coupled with the brush assembly, the second channel being adapted to at least partially direct flow of the particles from the first channel to the dust collector. The automatic cleaning mode may include a manual cleaning mode selectable by a user with a switch located in the vehicle and an ignition-off cleaning mode adapted for remote activation by the user.

The controller may be adapted to open one or more windows in the vehicle by a predetermined amount prior to the cleaning and close the one or more windows after the cleaning has ended. A heating, ventilation, and air conditioning (HVAC) unit may be operatively connected to the vehicle and include an air purifying mode adapted to remove impurities from air in a cabin compartment of the vehicle. The controller is adapted to activate the air purifying mode after the cleaning has ended.

Disclosed herein is a method of operating an automatic cleaning system in a vehicle having a vehicle seat, and a controller with a processor and tangible, non-transitory memory. The method includes connecting a leg recliner assembly to the vehicle seat, the leg recliner assembly having a base section operatively connected to a seat frame and a leg-rest section. The method includes integrating a brush assembly in the leg-rest section and fitting a portable cleaner within the base section, the portable cleaner being fluidly coupled with the brush assembly. Upon activation of an automatic cleaning mode via the controller, the method includes moving the vehicle seat along a first axis until a rack and pinion mechanism in the seat frame moves from a rest position to an engaged position. The method includes adjusting a position of the leg-rest section such that a portion of the brush assembly is in contact with a floor surface of the vehicle, via the controller. The method includes moving the brush assembly along a second axis, via the rack and pinion mechanism, to clean the floor surface during the automatic cleaning mode.

The above features and advantages and other features and advantages of the present disclosure are readily apparent from the following detailed description of the best modes for carrying out the disclosure when taken in connection with the accompanying drawings.

DETAILED DESCRIPTION

Figure 1:
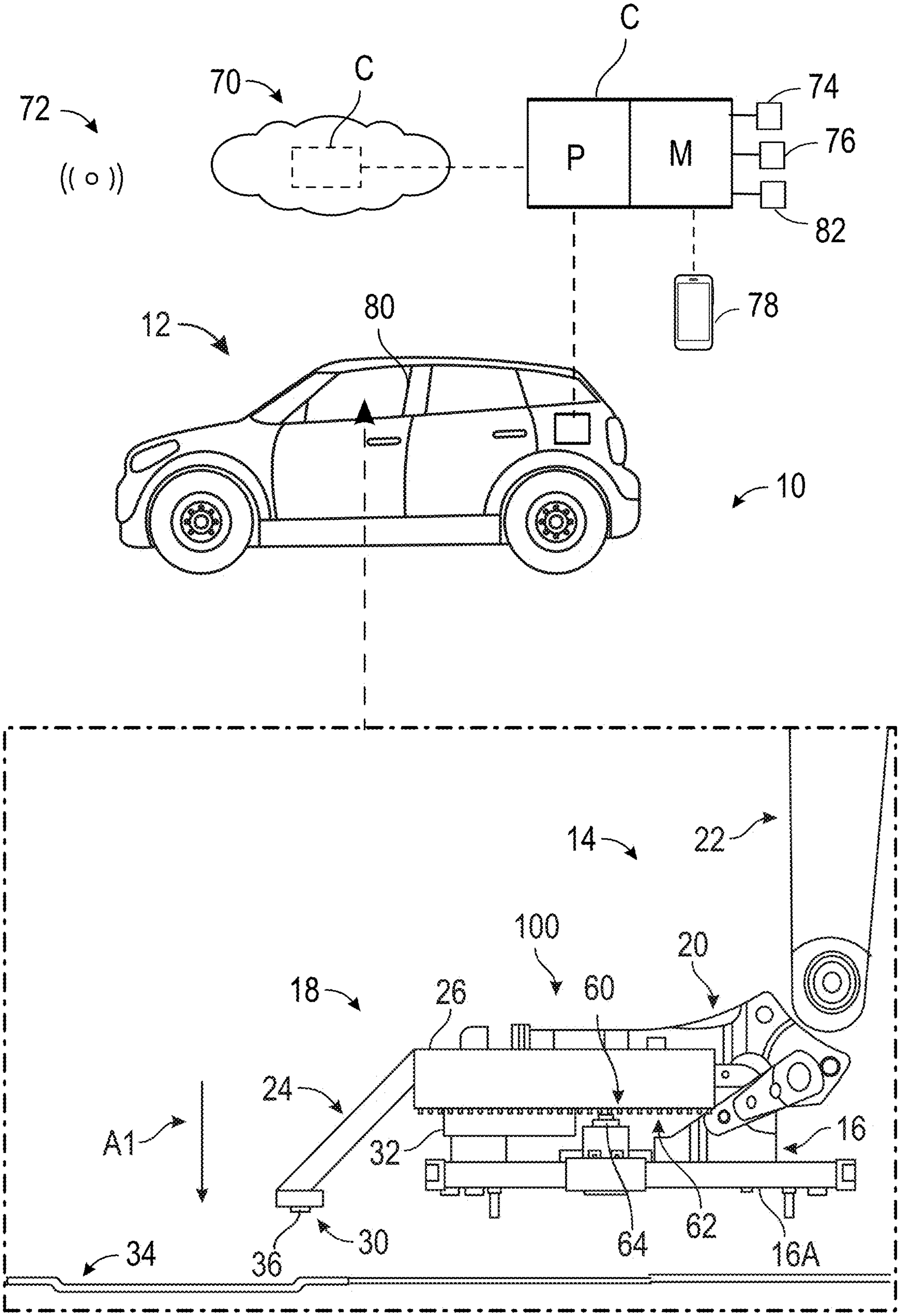
FIG. 1 is a schematic diagram of a system for cleaning a floor surface in a vehicle having a vehicle seat.

Referring to the drawings, wherein like reference numbers refer to like components, FIG. 1 schematically illustrates an automatic cleaning system 10 (referred to as "system 10" hereinafter) for cleaning portions of a vehicle 12 having a vehicle seat 14. The vehicle 12 may be a mobile platform such as, but not limited to, a passenger car, sport utility car, light truck, heavy duty truck, ATV, minivan, bus, transit vehicle, bicycle, robot, farm implement (e.g., tractor), sports-related equipment (e.g., golf cart), boat, airplane and train. The vehicle 12 may take many different forms and include multiple and/or alternate components and facilities. It is to be understood that the vehicle 12 may take many different forms and have additional components.

Figure 2:
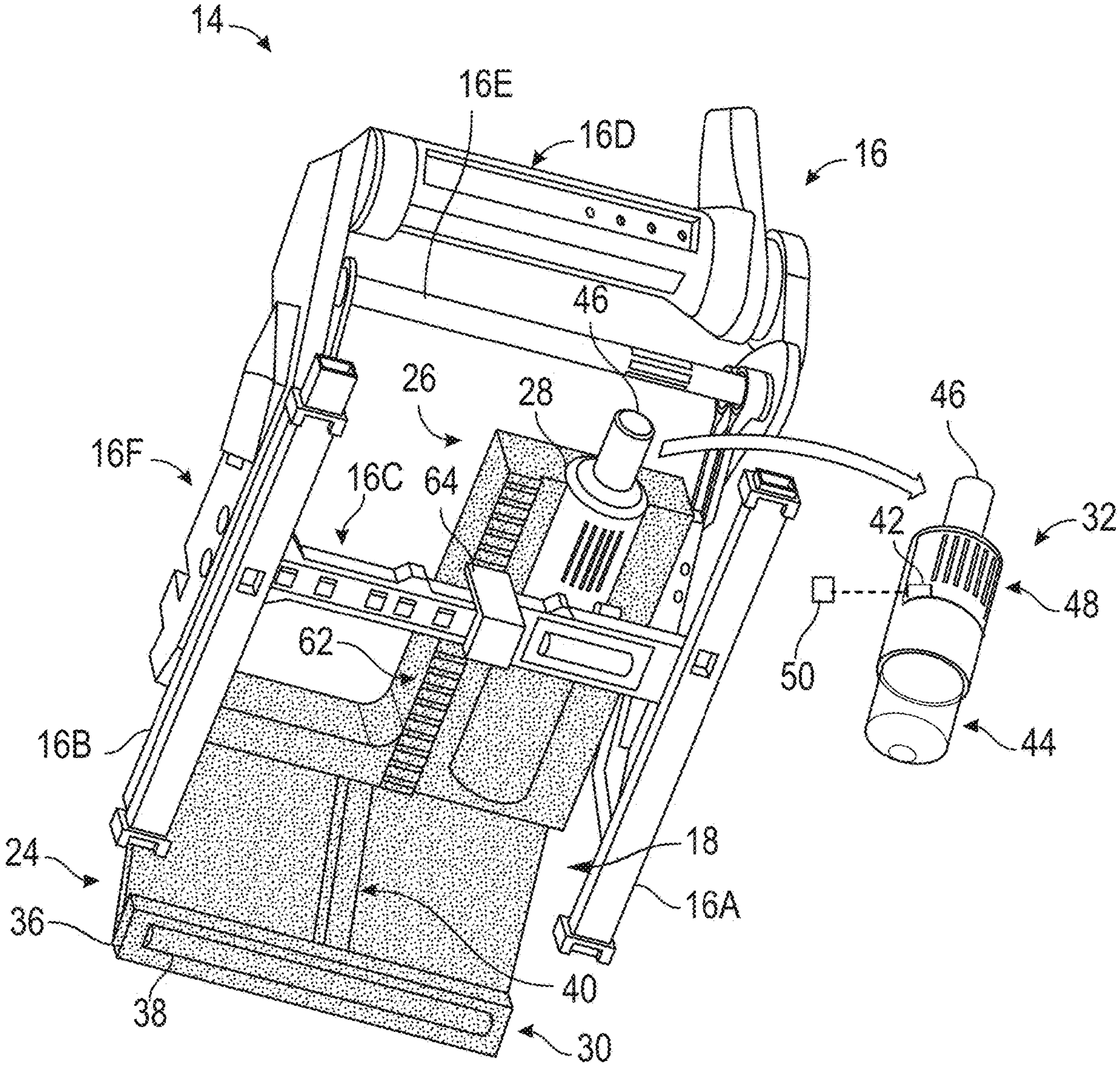
FIG. 2 is a schematic perspective underside view of the vehicle seat of FIG. 1.

FIG. 2 is a schematic perspective view of an underside of the vehicle seat 14. The vehicle seat 14 has a seat frame 16 and a leg recliner assembly 18 (shaded in FIG. 2). The vehicle seat 14 further includes a seat cushion 20, and a backrest 22, shown in FIG. 1. The seat frame 16 is made up of multiple components, such as elements 16A, 16B, 16C, 16D, 16E, 16F, shown in FIGS. 1-2. Referring to FIGS. 1-2, the leg recliner assembly 18 has a leg-rest section 24 for a user to rest the lower portion of their body and a base section 26 that is operatively connected to the seat frame 16. The leg-rest section 24 is positioned at an angle relative to the base section 26 and is pivotable relative to the base section 26. As shown in FIG. 2, the base section 26 may be located between side rails (elements 16A, 16B) of the seat frame 16. The dimensions of the leg recliner assembly 18 may be varied based on the application at hand.

As described below, a brush assembly 30 and a portable cleaner 32 are integrated within the leg recliner assembly 18 and work in tandem to clean a floor surface 34 in a cabin compartment of the vehicle 12. The floor surface 34 may be rubber, plastic, carpet or other material. The floor surface 34 may be the vehicle floor itself or a covering above the floor. The system 10 maximizes the use of seat packaging space. Referring to FIGS. 1-2, the brush assembly 30 is integrated with or integrally formed with the leg-rest section 24 of the leg recliner assembly 18. Referring to FIG. 2, the portable cleaner 32 is fitted within the base section 26 of the leg recliner assembly 18 and is fluidly coupled with the brush assembly 30.

Figure 3:
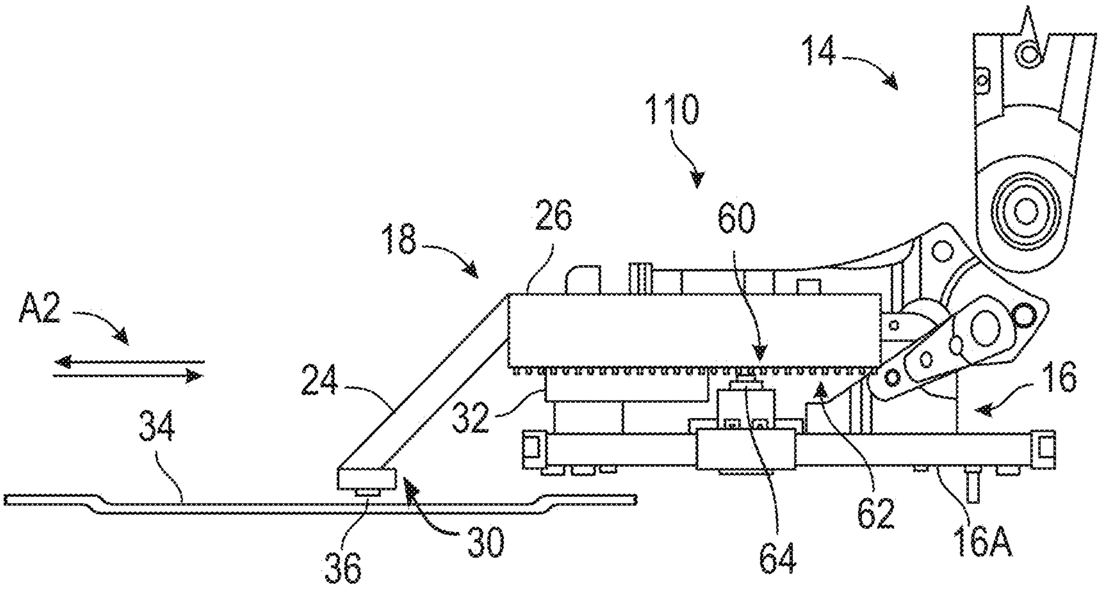
FIGS. 3-4 are schematic side views illustrating various positions of the vehicle seat of FIG. 1.
Figure 4:
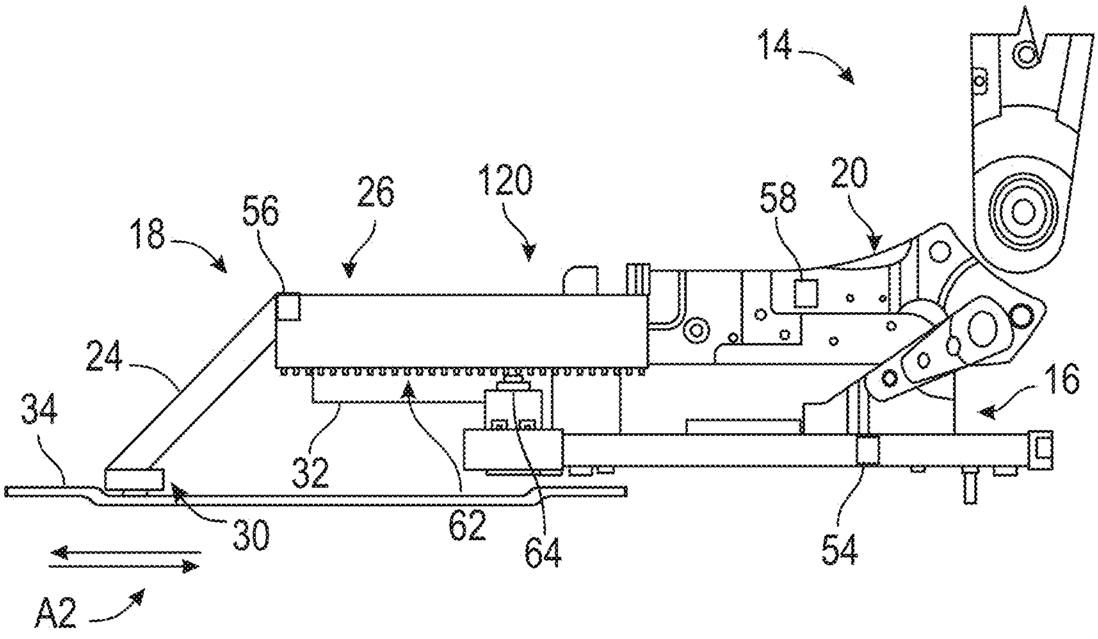

FIGS. 3-4 are schematic side views illustrating the vehicle seat 14 in various positions. Referring to FIGS. 1-4, the brush assembly 30 includes an intake port 36 adapted to receive particles suctioned from the floor surface 34. The brush assembly 30 may include a roller 38 (see FIG. 2) with bristles adapted to agitate and/or lift particles on the floor surface 34. Referring to FIG. 2, the brush assembly 30 includes a first channel 40 that forms a passageway for the particles (e.g., dust and dirt) suctioned by the intake port 36. The brush assembly 30 and the first channel 40 may be hidden from view under the leg-rest section 24. The first channel 40 is adapted to at least partially direct flow of the particles between the intake port 36 and the portable cleaner 32.

Referring to FIG. 2, the portable cleaner 32 is at least partially enclosed in the base section 26, for example, by being fitted within a cavity 28 in the base section 26. The portable cleaner 32 includes a suction motor 42, a dust collector 44, and a cover 46. The suction motor generates the suction force for lifting and collecting particles from the floor surface 34, e.g. by rapidly spinning a fan 48 to create a low-pressure area inside the portable cleaner 32. Due to the difference in air pressure, air rushes into the vacuum, bringing dust and debris with it. It is understood that the suction motor 42 may include other electrical components available to those skilled in the art. The particles are deposited or stored in the dust collector 44, which may be emptied intermittently by the user.

Figures 5, 6:
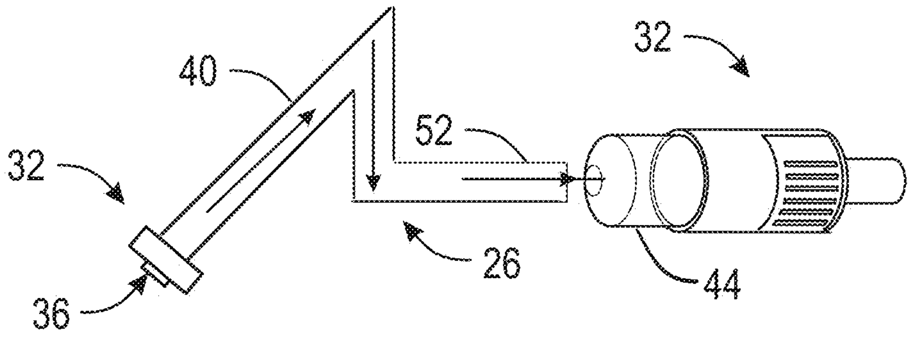
FIG. 5 is a schematic flow diagram for an example method executable by the controller of FIG. 1.
FIG. 6 is a schematic diagram illustrating an example path for particles lifted from the floor surface by the system of FIG. 1.

Referring to FIGS. 1-2, the first channel 40 is integrated with the leg-rest section 24 and fluidly coupled with the intake port 36 such that the suctioned particles flow from the intake port 36 to the first channel 40. An example path for particles lifted from the floor surface by the system 10 is shown in FIG. 6 (other elements of the seat frame 16 and leg recliner assembly 18 omitted for clarity). Referring to FIG. 6, a second channel 52 may be embedded within the base section 26 and fluidly coupled with the brush assembly 30. The second channel 52 is constructed such that the particles flow from the first channel 40 to the dust collector 44 via the second channel 52. It is understood that the shape, size and number of segments in the passageway for the particles may be varied based on the application at hand. The portable cleaner 32 may include a filter adapted to trap dust and other microscopic particles, preventing them from being released back into the vehicle cabin.

Referring to FIG. 2, a power source 50 is adapted to charge the suction motor 42 and may be located in the portable cleaner 32 or other parts of the vehicle seat 14. In some embodiments, the portable cleaner 32 may be detachable or removable from the base section 26 to function as a hand-held vacuum cleaner. The portable cleaner 32 may be fitted with an external nozzle (not shown) for independent cleaning.

The vehicle seat 14 may be equipped with various sensors available to those skilled in the art. Referring to FIG. 3, a seat motor 54 is adapted to selectively power motion of the vehicle seat. The seat motor may be employed for seat movement related to the automatic cleaning mode as well as seat adjustment based on user preference. Referring to FIG. 3, the system 10 may include a torque sensor 56 adapted to monitor a position of the brush assembly. In some embodiments, the vehicle seat 14 is equipped with a weight sensor 58 (shown in FIG. 3) or seatbelt buckle sensor to assess whether the vehicle seat 14 is vacant (see block 212, described below with respect to FIG. 5).

Referring to FIGS. 1-2, the system 10 includes a rack and pinion mechanism 60 for guiding the motion of the vehicle seat 14. In the embodiment shown in FIGS. 1-3, the rack and pinion mechanism 60 includes a rack 62 and pinion gear 64. The pinion gear 64 may be part of a gear box that is integrated with a seat motor spindle, shown in FIG. 2 as element 16C. The pinion gear 64 (together with the gear box) may be rotated with the seat motor spindle (element 16C in FIG. 2). FIG. 1 shows the rack and pinion mechanism 60 in a rest position 100. FIGS. 3-4 illustrate the rack and pinion mechanism 60 in an engaged position 110 and an extended position 120, respectively. The rack and pinion mechanism 60 is configured such that rotation of the pinion gear 64 (when in contact with the rack 62) causes linear motion of the rack, resulting in the motion of the brush assembly 30 along with it. In other words, the rack and pinion mechanism 60 moves to the engaged position 110 when the pinion gear 64 is in contact with the rack 62. The pinion gear 64 is adapted to move the system 10 linearly movement back and forth.

Referring to FIG. 1, the system 10 includes a controller C having at least one processor P and at least one memory M (or non-transitory, tangible computer readable storage medium) on which instructions are recorded for executing a method 200 for operating an automatic cleaning mode, described below with reference to FIG. 5. The memory M can store controller-executable instruction sets, and the processor P can execute the controller-executable instruction sets stored in the memory M.

As described below, upon activation of the automatic cleaning mode, the controller C is adapted to move the vehicle seat along a first axis A1 until the rack and pinion mechanism 60 is in the engaged position 110 (see FIG. 3) and adjust the position of the leg-rest section 24 such that a portion of the brush assembly 30 is in contact with the floor surface 34. The rack and pinion mechanism 60 is adapted to guide motion of the brush assembly 30 along a second axis A2 to conduct cleaning of the floor surface 34. The first axis A1 may be orthogonal to the second axis A2.

In one embodiment, the controller C is embedded in the vehicle 12. In another embodiment, the controller C is stored in an "off-board" or remotely located cloud computing service 70, shown in FIG. 1. Communication between the various components of the vehicle 12 and the cloud computing service 70 may occur through a wireless network 72. The cloud computing service 70 may include one or more remote servers hosted on the Internet to store, manage, and process data. The cloud computing service 70 may be at least partially managed by personnel at various locations, such as at a "back office."

Referring now to FIG. 5, a flowchart of the method 200 stored on and executable by the controller C of FIG. 1 is shown. Method 200 may be embodied as computer-readable code or instructions stored on and partially executable by the controller C of FIG. 1. Method 200 need not be applied in the specific order recited herein. Furthermore, it is to be understood that some steps may be eliminated.

Method 200 begins at block 210, when the automatic cleaning mode is activated. Referring to FIG. 1, the automatic cleaning mode includes one or more operating modes, such as a manual cleaning mode 74 that may be selected by a user with a switch or button located in the vehicle 12. The operating modes include an ignition-off cleaning mode 76 (after key-off) that may be remotely activated by the user. For example, the user may transmit instructions to the controller C through a mobile application 78, which may be installed on a smartphone, laptop, tablet, or other electronic device belonging to the user. The circuitry and components of a mobile application 78 ("apps") available to those skilled in the art may be employed.

Proceeding to block 212, controller C is programmed to ensure that the vehicle seat 14 is vacant prior to initiating the cleaning procedure. As noted above, the vehicle seat 14 may be equipped with a weight sensor 58 (shown in FIG. 3) or seatbelt sensor to assess whether the vehicle seat is vacant. If the seatbelt sensor detects that the seat belt is unbuckled, the vehicle seat 14 may be assumed to be vacant.

Advancing to block 214, the method 200 includes moving the vehicle seat 14 along the first axis A1 until the rack and pinion mechanism moves from a rest position 100 (shown in FIG. 1) to the engaged position 110 (shown in FIG. 3). The distance travelled by the vehicle seat 14 may be varied based on the application at hand. Per block 216, the controller C may be adapted to open one or more windows 80 in the vehicle 12 by a predetermined amount prior to the cleaning operation. As noted above, it is to be understood that some steps may be eliminated.

Proceeding to block 218, the controller C is adapted to adjust a position of the leg-rest section 24 such that a portion of the brush assembly 30 is in contact with the floor surface 34. Referring to FIG. 1, the system 10 may include a torque sensor 56 adapted to monitor a position of the brush assembly 30. The controller C is adapted to adjust the angle of the leg-rest section 24 relative to the base section 26 based on data from the torque sensor.

Proceeding to block 220, the method 200 includes moving the brush assembly 30 along a second axis to the extended position 120, via the rack and pinion mechanism 60, to clean the floor surface 34 during the automatic cleaning mode. The brush assembly 30 may be moved repeatedly back and forth for better results. Advancing to block 222, after the cleaning has ended, the method 200 includes moving the vehicle seat 14 in a reverse direction along the first axis A1 (opposite to the direction in block 214) until the rack and pinion mechanism 60 is disengaged, i.e., moves back to the rest position 100.

Proceeding to block 224, the controller C may be adapted to activate an air purifying mode 82 after the cleaning has ended. The air purifying mode 82 is adapted to remove impurities from air in a cabin compartment of the vehicle 12, and may be part of a heating, ventilation, and air conditioning (HVAC) unit. If the windows were opened prior to the cleaning operation, the controller C may be adapted to close the window(s) after the cleaning has ended.

In summary, the system 10 for cleaning a floor surface 34 in a vehicle 12 is integrated within the seat packaging. A leg recliner assembly 18 is employed as a solid structure for housing a brush assembly 30 and a portable cleaner 32. The brush assembly 30 includes an intake port 36 that engages with the floor surface 34. A rack and pinion mechanism 60 is embedded within a seat frame 16 for moving the brush assembly 30. As the brush assembly 30 moves back and forth relative to the original seat movement, the floor surface can be cleaned. The brush assembly 30 may be hidden from view under a leg-rest section 24 of the leg recliner assembly 18. The portable cleaner 32 may be removed by a user from the base section 26 (e.g., at the underside of the vehicle seat) and clean wherever desired.

The wireless network 72 of FIG. 1 may be a short-range network or a long-range network. The wireless network 72 may be a communication BUS, which may be in the form of a serial Controller Area Network (CAN-BUS). The wireless network 72 may be a serial communication bus in the form of a local area network which may include, but is not limited to, a Controller Area Network (CAN), a Controller Area Network with Flexible Data Rate (CAN-FD), Ethernet, Bluetooth, WIFI and other forms of data. The wireless network 72 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, other physical media, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for cleaning a floor surface in a vehicle, comprising:

a vehicle seat having a seat frame and a leg recliner assembly, the leg recliner assembly having a base section operatively connected to the seat frame and a leg-rest section;

a brush assembly integrated with the leg-rest section;

a portable cleaner fitted within the base section, the portable cleaner being fluidly coupled with the brush assembly;

a rack and pinion mechanism operatively connected to the seat frame;

a controller having a processor and tangible, non-transitory memory on which instructions are recorded for executing an automatic cleaning mode;

wherein the controller is adapted to, upon activation of the automatic cleaning mode, move the vehicle seat along a first axis until the rack and pinion mechanism moves from a rest position to an engaged position and adjust a position of the leg-rest section such that a portion of the brush assembly is in contact with the floor surface; and wherein the rack and pinion mechanism is adapted to guide motion of the brush assembly along a second axis to clean the floor surface during the automatic cleaning mode.

2. The system of claim 1, wherein the rack and pinion mechanism includes a rack and a pinion gear configured such that rotation of the pinion gear causes linear motion of the rack and the base section along the second axis, the rack and pinion mechanism being in the engaged position when the pinion gear is in contact with the rack.

3. The system of claim 1, further comprising:

a seat motor adapted to selectively power motion of the vehicle seat; and a torque sensor adapted to monitor a position of the brush assembly, the controller being adapted to adjust the position of the leg-rest section based on data from the torque sensor.

4. The system of claim 1, wherein:

the portable cleaner includes a suction motor and a dust collector; and the leg-rest section is pivotable relative to the base section, the leg-rest section being positioned at an angle relative to the base section.

5. The system of claim 4, further comprising:

a power source adapted to charge the suction motor; and wherein the controller is adapted to ensure that the vehicle seat is vacant prior to moving the vehicle seat.

6. The system of claim 4, wherein the brush assembly includes:

an intake port adapted to receive particles from the floor surface; and a first channel adapted to at least partially direct flow of the particles between the intake port and the dust collector.

7. The system of claim 6, further comprising:

a second channel embedded within the base section and fluidly coupled with the brush assembly, the second channel being adapted to at least partially direct flow of the particles from the first channel to the dust collector.

8. The system of claim 7, further comprising:

a heating, ventilation, and air conditioning (HVAC) unit operatively connected to the vehicle and having an air purifying mode adapted to remove impurities from air in a cabin compartment of the vehicle; and wherein the controller is adapted to activate the air purifying mode after the cleaning has ended.

9. The system of claim 1, wherein the automatic cleaning mode includes a manual cleaning mode selectable by a user with a switch located in the vehicle and an ignition-off cleaning mode adapted for remote activation by the user.

10. The system of claim 1, wherein the controller is adapted to open one or more windows in the vehicle by a predetermined amount prior to the cleaning and close the one or more windows after the cleaning has ended.

11. A method of operating an automatic cleaning system in a vehicle having a vehicle seat, and a controller with a processor and tangible, non-transitory memory, the method comprising:

connecting a leg recliner assembly to the vehicle seat, the leg recliner assembly having a base section operatively connected to a seat frame and a leg-rest section;

integrating a brush assembly in the leg-rest section and fitting a portable cleaner within the base section, the portable cleaner being fluidly coupled with the brush assembly;

upon activation of an automatic cleaning mode via the controller, moving the vehicle seat along a first axis until a rack and pinion mechanism in the seat frame moves from a rest position to an engaged position;

adjusting a position of the leg-rest section such that a portion of the brush assembly is in contact with a floor surface of the vehicle, via the controller; and moving the brush assembly along a second axis, via the rack and pinion mechanism, to clean the floor surface during the automatic cleaning mode.

12. The method of claim 11, further comprising:

configuring the rack and pinion mechanism with a rack and a pinion gear such that rotation of the pinion gear causes linear motion of the rack along the second axis, the rack and pinion mechanism being in the engaged position when the pinion gear is in contact with the rack.

13. The method of claim 11, further comprising:

powering motion of the vehicle seat with a seat motor; and monitoring a position of the brush assembly via a torque sensor; and adjusting the position of the leg-rest section based on data from the torque sensor.

14. The method of claim 11, further comprising:

suctioning particles from the floor surface via an intake port in the brush assembly; and directing the particles from the floor surface to the portable cleaner via a first channel in the brush assembly.

15. The method of claim 14, further comprising:

embedding a second channel within the seat frame, the portable cleaner having a dust collector; and constructing the second channel such that the particles are directed from the first channel to the dust collector via the second channel.

16. The method of claim 11, further comprising:

incorporating a manual cleaning mode and an ignition-off cleaning mode in the automatic cleaning mode, the manual cleaning mode being selectable by a user with a switch located in the vehicle and the ignition-off cleaning mode being adapted for remote activation by the user.

17. The method of claim 11, further comprising:

ensuring that the vehicle seat is vacant prior to moving the vehicle seat;

opening one or more windows in the vehicle by a predetermined amount prior to the cleaning and closing the one or more windows after the cleaning has ended; and removing impurities from air in a cabin compartment of the vehicle, via an air purifying mode accessible to the controller, after the cleaning has ended.

18. A vehicle comprising:

a vehicle seat having a seat frame and a leg recliner assembly, the leg recliner assembly having a base section operatively connected to the seat frame and a leg-rest section, the leg-rest section being pivotable relative to the base section;

a brush assembly integrally formed with the leg-rest section;

a portable cleaner fitted within the base section, the portable cleaner being fluidly coupled with the brush assembly;

a rack and pinion mechanism operatively connected to the seat frame and having a rack and pinion gear, the rack and pinion mechanism being in an engaged position when the pinion gear is in contact with the rack;

a controller having a processor and tangible, non-transitory memory on which instructions are recorded for executing an automatic cleaning mode;

wherein the controller is adapted to, upon activation of the automatic cleaning mode, move the vehicle seat along a first axis until the rack and pinion mechanism moves from a rest position to the engaged position and adjust a position of the leg-rest section such that a portion of the brush assembly is in contact with a floor surface of the vehicle; and wherein the rack and pinion mechanism is adapted to guide motion of the brush assembly along a second axis to clean the floor surface during the automatic cleaning mode, the rack and pinion mechanism being configured such that rotation of the pinion gear causes linear motion of the rack and the base section along the second axis.

19. The vehicle of claim 18, further comprising:

a seat motor adapted to selectively power motion of the vehicle seat; and a torque sensor adapted to monitor a position of the brush assembly, the controller being adapted to adjust the position of the leg-rest section based on data from the torque sensor.

20. The vehicle of claim 18, wherein:

the portable cleaner includes a suction motor, and a dust collector;

the brush assembly includes an intake port adapted to receive particles from the floor surface, and a first channel adapted to at least partially direct flow of the particles between the intake port and the dust collector; and the base section includes a second channel embedded within and fluidly coupled with the brush assembly, the second channel being adapted to at least partially direct flow of the particles from the first channel to the dust collector.

* * * * *